(12) United States Patent
Lee et al.

(10) Patent No.: US 9,921,701 B2
(45) Date of Patent: Mar. 20, 2018

(54) TOUCHSCREEN PANEL

(71) Applicant: LG DISPLAY CO., LTD., Seoul (KR)

(72) Inventors: Namseok Lee, Seoul (KR); Junghwan Lee, Daegu (KR); Sunggon Hong, Seoul (KR); Dongjoong Cha, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 73 days.

(21) Appl. No.: 15/223,265

(22) Filed: Jul. 29, 2016

(65) Prior Publication Data

US 2017/0031501 A1 Feb. 2, 2017

(30) Foreign Application Priority Data

Jul. 31, 2015 (KR) .................. 10-2015-0109210

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
CPC .................. G06F 3/044; G06F 2203/04111
See application file for complete search history.

(56) References Cited

U.S. PATENT DOCUMENTS

| | | | | |
|---|---|---|---|---|
| 8,558,805 B2 * | 10/2013 | Lee | ......................... | G06F 3/044 |
| | | | | 345/173 |
| 2010/0182255 A1 * | 7/2010 | Jeong | ..................... | G06F 3/044 |
| | | | | 345/173 |
| 2011/0234510 A1 * | 9/2011 | Jeong | ..................... | G06F 3/044 |
| | | | | 345/173 |

* cited by examiner

*Primary Examiner* — Lisa Landis
(74) *Attorney, Agent, or Firm* — Morgan, Lewis & Bockius LLP

(57) ABSTRACT

A touchscreen panel includes first and second electrode lines that cross each other with one of the first and second electrode lines being separated from the intersection of the first and second electrode lines, and the separated electrode line being connected to a bridge pattern via lower contact holes penetrating a first insulating film. The touchscreen panel includes a second insulating film covering the first insulating film; and a conductor rod pattern that is electrically connected to the separated electrode line via an upper contact hole penetrating the second insulating film and that overlaps the bridge pattern.

8 Claims, 8 Drawing Sheets

TOUCHSCREEN PANEL

This application claims the priority benefit of Korean Patent Application No. 10-2015-0109210 filed on Jul. 31, 2015, which is incorporated herein by reference for all purposes as if fully set forth herein.

BACKGROUND OF THE INVENTION

Field of the Invention

The present disclosure relates to a touchscreen panel, and more particularly, to a touch screen panel with a conductor rod pattern (or a lightning rod pattern).

Discussion of the Related Art

In recent years, display devices, such as liquid crystal displays, electroluminescent displays, and plasma display panels, having fast response time, low power consumption, and excellent color reproduction, have been in the spotlight. Such display devices have been used for a variety of electronic products such as televisions, monitors for computers, laptop computers, mobile phones, displays on refrigerators, personal digital assistants, and automated teller machines. In general, these display devices interface with a user through a variety of input devices such as a keyboard, a mouse, or a digitizer. However, using a separate input device such as a keyboard or mouse requires the user to learn how to use it and also takes up space, making it difficult to increasing the maturity of the products. In light of this situation, there is a growing demand for input devices that are convenient and easy to use and can reduce glitches. In response to this demand, a touchscreen panel for enabling a user to input information by directly touching the screen with his or her hand or a pen was suggested.

The touchscreen panel is adapted for use in a variety of display devices since it is easy to use, has less glitches, and enables input without a separate input device, along with the convenience of allowing the user to quickly and easily manipulate it through content displayed on the screen.

Touchscreen panels are classified into resistive type, capacitive type, and electromagnetic type, depending on the method of sensing a touched position. The resistive touchscreen panel detects a touched position by the gradient of voltage versus resistance, while a DC voltage is being applied to an upper or lower substrate with metal electrodes on it. The capacitive touchscreen panel senses a touched position by sensing a change in voltage on the upper or lower substrate when the user touches an equipotential conductive film formed on the upper or lower substrate. The electromagnetic touchscreen panel senses a touched position by reading an LC value induced when an electronic pen touches a conductive film.

Hereinafter, a related art capacitive touchscreen panel TSP will be described with reference to FIGS. 1 and 2. FIG. 1 is a plan view of a related art capacitive touchscreen panel. FIG. 2 is a cross-sectional view taken along line I-I' of the touchscreen panel of FIG. 1.

Referring to FIGS. 1 and 2, the related art capacitive touchscreen panel comprises an electrode portion A formed on a transparent substrate. The electrode portion A comprises a plurality of first electrode lines 10 arranged in parallel to a first direction (e.g., along the X-axis) and a plurality of second electrode lines 20 arranged perpendicular to the first electrode lines 10 (e.g., along the Y-axis) to cross the first electrode lines 10. Each first electrode line 10 comprises first electrode patterns 12 and first connecting patterns 14 connecting the first electrode patterns 12. Each second electrode line 20 comprises second electrode patterns 22 and second connecting patterns 24 connecting the second electrode patterns 22. The first connecting patterns 14 attach neighboring first electrode patterns 12 together via contact holes 30a and 30b formed in an insulating film PAS1 covering the first and second electrode patterns 12 and 22.

In this structure, the connecting patterns, especially the first connecting patterns 14, are vulnerable to ESD (electrostatic discharge). That is, the first connecting patterns 14 have relatively high resistance since they are narrower in width than the second connecting patterns 24, first electrode patterns 12, and second electrode patterns 22. When overcurrent flows into the first connecting patterns 14 with high resistance, the first connecting patterns 14 may be damaged and open-circuited. Also, the first electrode lines 10 and the second electrode lines 20 may be short-circuited due to insulation breakdown.

Due to this reason, the first connecting patterns 14 can easily be damaged by static electricity. The damage to the first connecting patterns 14 may lead to a number of problems, including causing the touchscreen panel TSP to malfunction and decreasing product reliability.

SUMMARY

Accordingly, the present invention is directed to a touchscreen panel that substantially obviates one or more of the problems due to limitations and disadvantages of the related art.

An object of the present disclosure is to provide a touchscreen panel that can improve ESD problems by comprising a conductor rod pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touchscreen panel comprises first and second electrode lines that cross each other, one of the first and second electrode lines being separated from the intersection of the first and second electrode lines, and the separated electrode line being connected to a bridge pattern via lower contact holes penetrating a first insulating film. The touchscreen panel comprises a second insulating film covering the first insulating film; and a conductor rod pattern that is electrically connected to the separated electrode line via an upper contact hole penetrating the second insulating film and that overlaps the bridge pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. In describing various embodiments, descriptions of the same or like parts will be made representatively in the first exemplary embodiment but omitted in other embodiments.

The present invention is characterized in that overcurrent flowing into a bridge pattern due to static electricity is distributed to a conductor rod pattern (or, lightning rod pattern). That is, a touchscreen panel according to the present invention comprises first and second electrode lines that cross each other. One of the first and second electrode lines is separated from the intersection of the first and second electrode lines. The separated electrode line is connected to the bridge pattern via lower contact holes penetrating a first insulating film and electrically connected to it. The conductor rod pattern is electrically connected to the separated electrode line via an upper contact hole in a second insulating film covering the first insulating film, and overlaps the bridge pattern.

In one embodiment of the present invention, the bridge pattern may be disposed under the first insulating film, and the first and second electrode lines may be disposed between the first and second insulating films. In this instance, the separated electrode line is connected to the conductor rod pattern. In another embodiment of the present invention, the first and second electrode lines may be disposed under the first insulating film, and the bridge pattern may be disposed between the first and second insulating films. In this instance, the bridge pattern (hereinafter, referred to as "first connecting pattern") is connected to the conductor rod pattern.

Hereinafter, exemplary embodiments of the present invention will be described concretely with reference to FIGS. 3 through 8.

First Exemplary Embodiment

Figure 1:
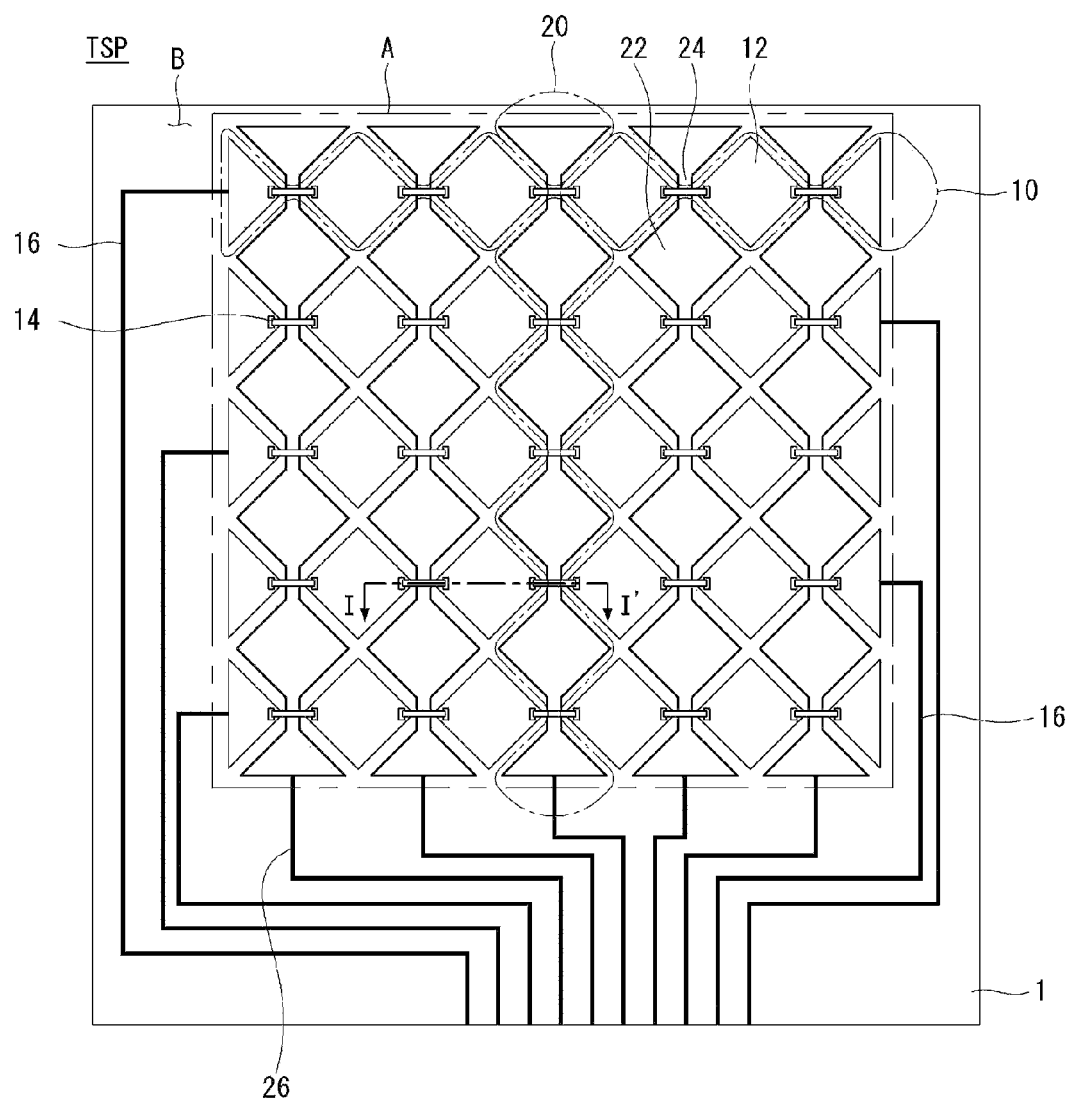
FIG. 1 is a plan view of a related art capacitive touchscreen panel.
Figure 2:
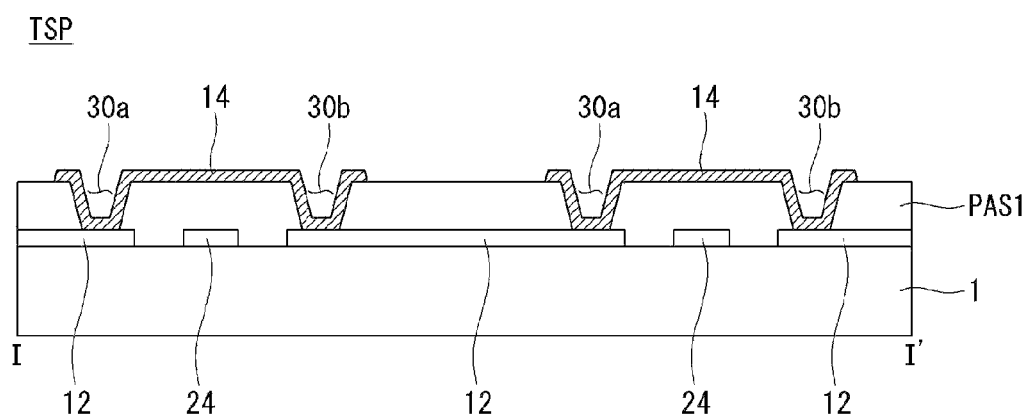
FIG. 2 is a cross-sectional view taken along line I-I' of the touchscreen panel of FIG. 1.
Figure 3:
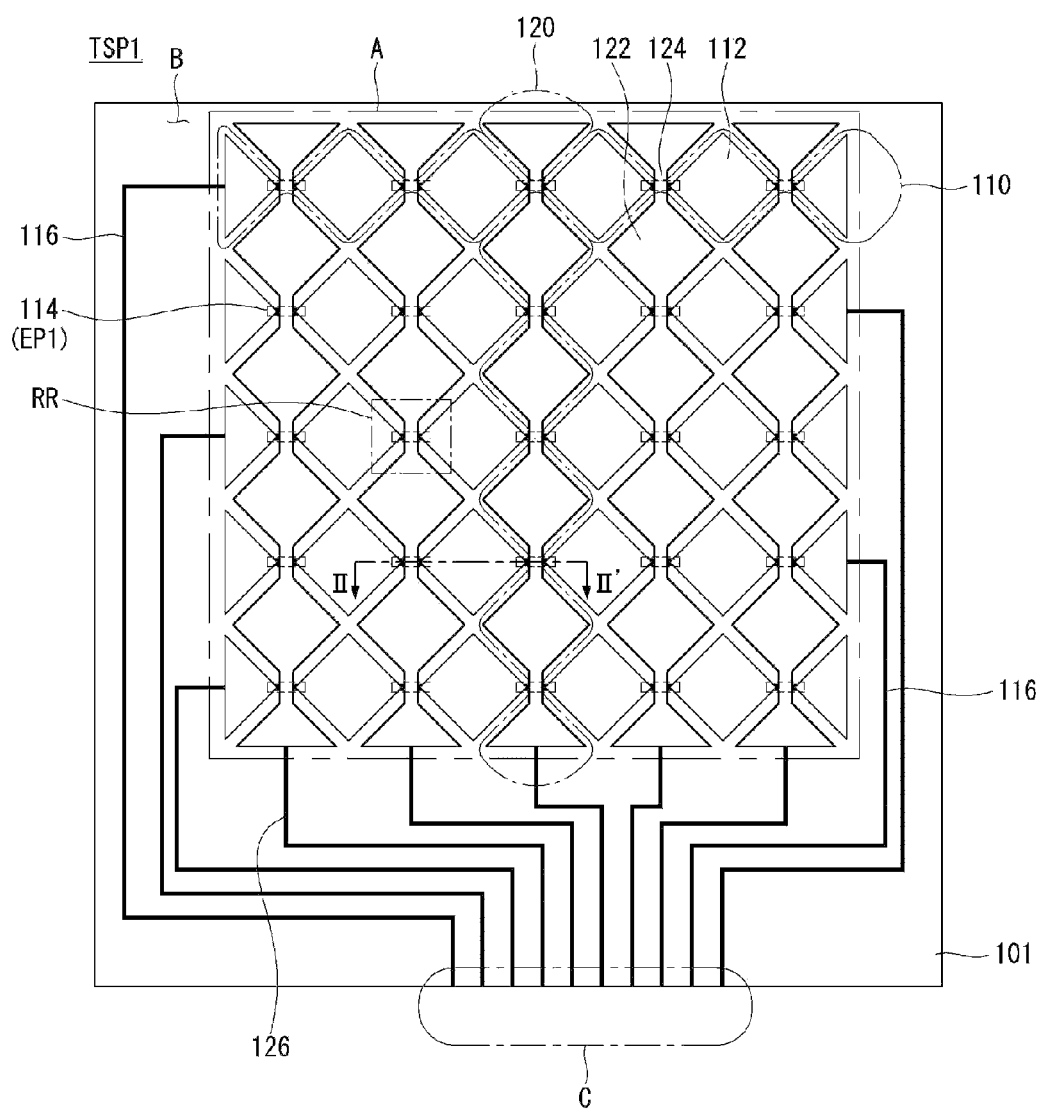
FIG. 3 is a plan view of a touchscreen panel according to a first exemplary embodiment of the present invention.
Figure 4:
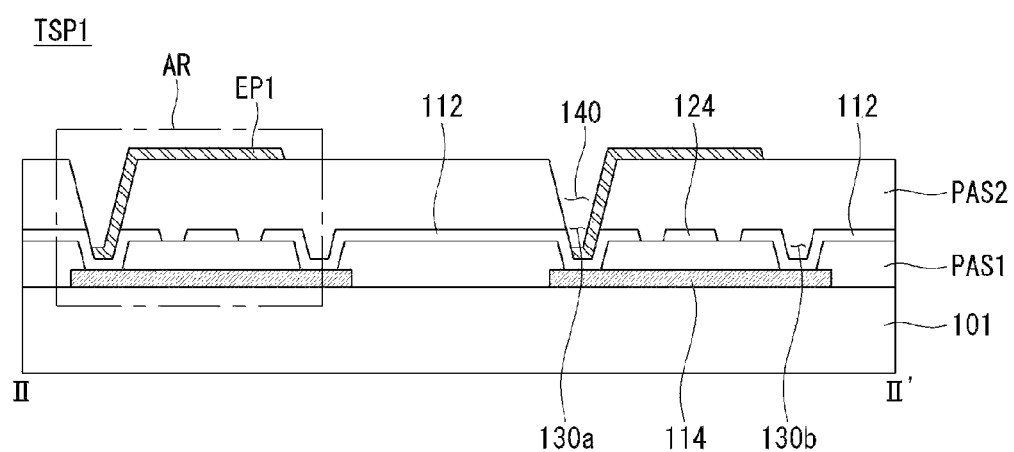
FIG. 4 is a cross-sectional view taken along line II-II' of the touchscreen panel of FIG. 3 according to the first exemplary embodiment of the present invention.
Figure 5:
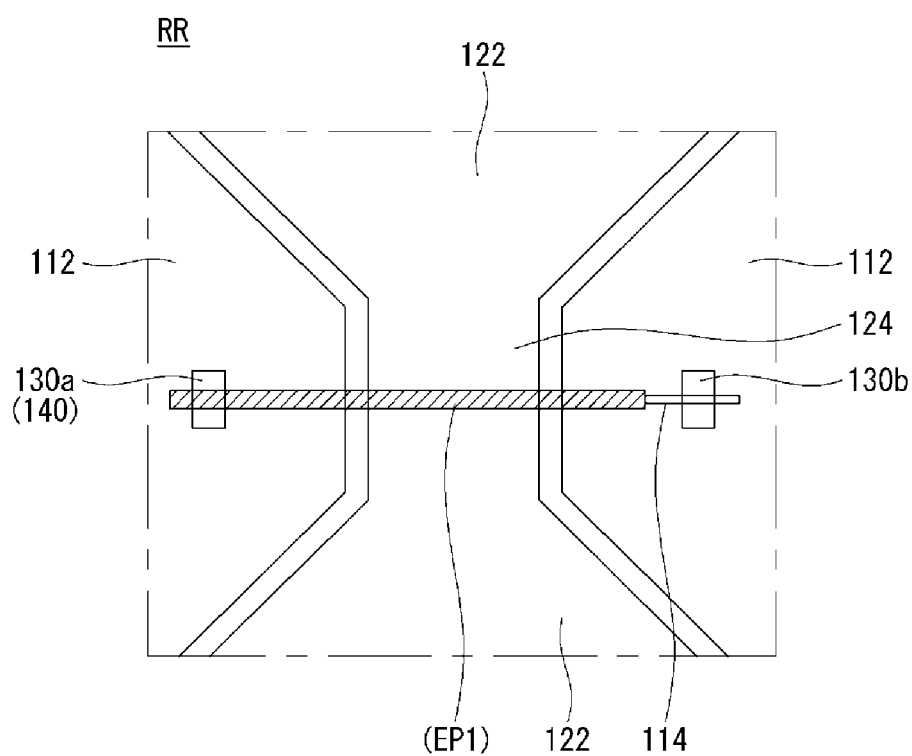
FIG. 5 is an enlarged view of the PR area of FIG. 3.
Figure 6:
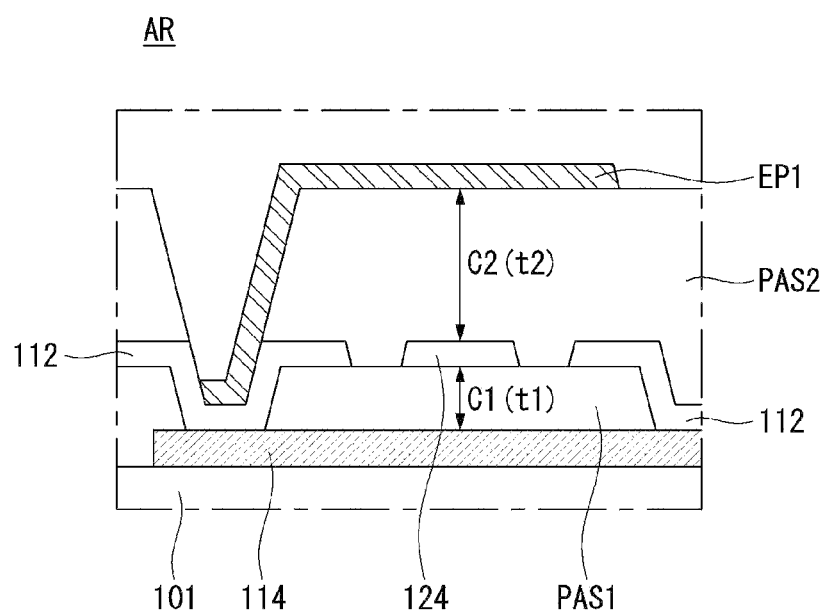
FIG. 6 is an enlarged view of the AR area of FIG. 4.

A touchscreen panel TSP1 according to a first exemplary embodiment of the present invention will be described with reference to FIGS. 3 through 6. FIG. 3 is a plan view of a touchscreen panel according to a first exemplary embodiment of the present invention. FIG. 4 is a cross-sectional view taken along line II-II' of the touchscreen panel of FIG. 3 according to the first exemplary embodiment of the present invention. FIG. 5 is an enlarged view of the PR area of FIG. 3. FIG. 6 is an enlarged view of the AR area of FIG. 4.

Referring to FIG. 3, the touchscreen panel TSP1 according to the first exemplary embodiment of the present invention comprises an electrode portion A, a routing wiring portion B, and a pad portion C.

The electrode portion A comprises a plurality of first electrode lines 110 arranged in parallel to a first direction (e.g., along the X-axis), a plurality of second electrode lines 120 arranged in a second direction (e.g., along the Y-axis) to cross the first electrode lines 110, and conductor rod patterns EP1 electrically connected to the first electrode lines 110. Each first electrode line 110 comprises first electrode patterns 112 that are triangular, rectangular, or diamond in shape and first connecting patterns 114 connecting the first electrode patterns 112. Each second electrode line 120 comprises second electrode patterns 122 that are triangular, rectangular, or diamond in shape, similar to the first electrode patterns 112, and second connecting patterns 124 connecting the second electrode patterns 122.

In the exemplary embodiment of the present invention, the first connecting patterns 114 are formed separately from the first electrode patterns 112, and the second connecting patterns 124 are formed integrally with the second electrode patterns 122. Conversely, the first connecting patterns 114 may be formed integrally with the first electrode patterns 112, and the second connecting patterns 124 may be formed separately from the second electrode patterns 122. For ease of explanation, a description of the first electrode patterns 114 formed separately from the first electrode patterns 112 will be given below by way of example.

The conductor rod patterns EP1 are electrically connected to the first electrode lines 110. The conductor rod patterns EP1 overlap the first connecting patterns 114. In the first exemplary embodiment of the present invention, overcurrent, which may flow into the first connecting patterns 114 due to static electricity generated during manufacturing, physical distribution, etc., is directed toward the conductor rod patterns EP1.

The routing wiring portion B is formed outside the electrode portion A, and consists of a plurality of first routing wires 116 respectively connected to the plurality of first electrode lines 110 and a plurality of second routing wires 126 respectively connected to the plurality of second electrode lines 120.

The pad portion C consists of a plurality of first pads (not shown) respectively connected to the plurality of first electrode lines 110 through the plurality of first routing wires 116 and a plurality of second pads (not shown) respectively connected to the plurality of second electrode lines 120 through the plurality of second routing wires 126.

Referring further to FIG. 4, the first connecting patterns 114 and the first and second routing wires 116 and 126 may be formed on a substrate 100 by the same process, using the same material. The first connecting patterns 114 and the first and second routing wires 116 and 126 may be made from Al, AlNd, Mo, MoTi, Cu, and Cr. They are low-resistivity materials that can reduce the resistance at connecting portions of electrode. The first connecting patterns 114 and the first and second routing wires 116 and 126 also may be made from a transparent conductive material such as ITO (indium tin oxide). However, its high resistivity may be considered when choosing to use a transparent conductive material such as ITO. Also, resistance and visibility may be taken into consideration when determining the thickness and width of the first connecting patterns 114. In other words, the problem is that the thinner or narrower the first connecting patterns 114, the higher the resistance, and that the wider the first connecting patterns 114, the higher their visibility.

A first insulating film PAS1 having a first thickness t1 is formed on the substrate 100 where the first connecting patterns 114 and the first and second routing wires 116 and 126 are formed. The first insulating film PAS1 may comprise, but is not limited to, silicon nitride (SiNx) and silicon oxide ($SiO_2$). First and second lower contact holes 130a and 130b exposing both ends of the first connecting patterns 114 are formed on the first insulating film PAS1.

The plurality of first electrode patterns 112 arranged in the first direction, the plurality of second electrode patterns 122 arranged in the second direction, and the second connecting patterns 124 connecting the second electrode patterns 122 are formed on the first insulating film PAS1 where the first lower contact holes 130a and the second lower contact holes 130b are formed. The first electrode patterns 122 are separate from each other, but are electrically connected as they come into contact with both ends of the first connecting patterns 114 under the first insulating film PAS1 via the first lower contact holes 130a and second lower contact holes 130b in the first insulating film PAS1.

The first electrode patterns 112, the second electrode patterns 122 and the second connecting patterns 124 may be made from the same material by the same process. For example, the first electrode patterns 112, the second electrode patterns 122, and the second connecting patterns 124 may be made from a transparent conductive material such as ITO (Indium Tin Oxide), IZO (Indium Zinc Oxide), or GZO (Gallium-Doped Zinc Oxide). The transparent conductive material such as ITO is advantageous in that its electrical conductivity increase as its thickness increases, but with a decrease in light transmission. Thus, it is necessary to properly adjust the thickness of the transparent conductive material by taking electrical conductivity and light transmission into account.

A second insulating film PAS2 having a second thickness t2 is formed on the substrate 100 where the first electrode patterns 112, the second electrode patterns 112, and the second connecting patterns 124 are formed. Upper contact holes 140 partially exposing the first electrode patterns 112 are formed on the second insulating film PAS2. The upper contact holes 140 overlap the first connecting patterns 114. In an example, the upper contact holes 140 may overlap either the first lower contact holes 130a or the second lower contact holes 130b, but the present invention is not limited to this example.

Conductor rod pattern EP1 to be connected to part of the first electrode patterns 112 via the upper contact holes 140 are formed on the second insulating film PAS2 where the upper contact holes 140 are formed. The conductor rod patterns EP1 overlap the first connecting patterns 114. The conductor rod patterns EP1 are made from a conductive material. In the present invention, overcurrent, which may be concentrated in the first connecting patterns 114, may be distributed to the conductor rod patterns EP1. Accordingly, the first exemplary embodiment of the present invention allows for safe protection of the touchscreen panel TSP1 from static electricity.

Referring further to FIG. 5, visibility may be taken into consideration when determining the area of the conductor rod patterns EP1. That is, the area of the conductor rod patterns EP1 should be equal to or smaller than the area of the first connecting patterns 114 so that the conductor rod patterns EP1 do not protrude out of the first connecting patterns 114. Accordingly, the present invention ensures that the conductor rod patterns EP1 are not visible to the user from the front, thereby eliminating the problem of low visibility caused by the conductor rod patterns EP1.

In the first exemplary embodiment of the present invention, the resistance of the conductor rod patterns EP1 can be adjusted so that overcurrent caused by static electricity is directed toward the conductor rod patterns EP1. The conductor rod pattern EP1 may be made from a different material than the first connecting patterns 114. That is, the material of the conductor rod patterns EP1 may have lower resistance than the material of the first connecting patterns 114. In this instance, electrical charge, which may be concentrated in the first connecting patterns 114, may be directed toward the conductor rod patterns EP1 since electrical charge tends to go where resistance is relatively low. In the first exemplary embodiment of the present invention, the conductor rod patterns EP1 are made from a material that is different from the first connecting patterns 114 and has lower resistance, so that overcurrent, which may flow into the first connecting patterns 114 due to static electricity, is distributed to the conductor rod patterns EP1.

The first exemplary embodiment of the present invention allows for adjustment of capacitance formed by the overlapping of the conductor rod patterns EP1 and the second electrode lines 120 with the second insulating film PAS2 interposed between them, in order that overcurrent caused by static electricity is directed toward the conductor rod patterns EP1.

Referring further to FIG. 6, the touchscreen panel TSP1 according to the first exemplary embodiment of the present invention comprises a first capacitance C1 formed by the overlapping of the first connecting patterns 114 and the second electrode lines 120 with the first insulating film PAS1 interposed between them, and a second capacitance C2 formed by the overlapping of the conductor rod patterns EP1 and the second electrode lines 120 with the second insulating film PAS2 interposed between them. In the first exemplary embodiment of the present invention, the second capacitance C2 may be adjusted to be lower than the first capacitance C1, since electrical charge tends to go where capacitance is low.

$$C = \varepsilon \frac{A}{d} \qquad \text{[Equation 1]}$$

where C is capacitance, $\varepsilon$ is dielectric constant, A is area, and d is thickness. In the first exemplary embodiment of the present invention, electrical charge may be directed toward the conductor rod patterns EP1 by adjusting the values of factors for determining the C.

In the first exemplary embodiment of the present invention, electrical charge may be directed toward the conductor rod patterns EP1 by adjusting the thickness t of the second insulating film PAS2. That is, in the first exemplary embodiment, the second insulating film PAS2 may be made thicker than the first insulating film PAS1, in order that the second capacitance C2 is lower the first capacitance C1. Accordingly, the first exemplary embodiment can reduce ESD problems by distributing overcurrent caused by static electricity to the conductor rod patterns EP1.

In the first exemplary embodiment of the present invention, the second insulating film PAS2 may be made from a different material than the first insulating film PAS1 so that electrical charge is directed toward the conductor rod patterns EP1. That is, in the first exemplary embodiment, the material of the second insulating film PAS2 may have a lower dielectric constant c than the material of the first insulating film PAS1. Accordingly, the first exemplary embodiment can reduce ESD problems by distributing overcurrent caused by static electricity to the conductor rod patterns EP1.

In the first exemplary embodiment of the present invention, electrical charge may be directed toward the conductor rod patterns EP1 by adjusting the area A of the second insulating film PAS2. That is, in the first exemplary embodiment, the area of the conductor rod patterns EP1 may be decreased so that the second capacitance C2 is lower than the first capacitance C1. As described above, visibility needs to be taken into account for the design of the conductor rod patterns EP1. Thus, the conductor rod patterns EP1 may have a smaller area than the first connecting patterns 114, without protruding out of the first connecting patterns 114 to prevent the conductor rod patterns EP1 from being seen from the front. Accordingly, the first exemplary embodiment can reduce ESD problems by distributing overcurrent caused by static electricity to the conductor rod patterns EP1.

Second Exemplary Embodiment

Figure 7:
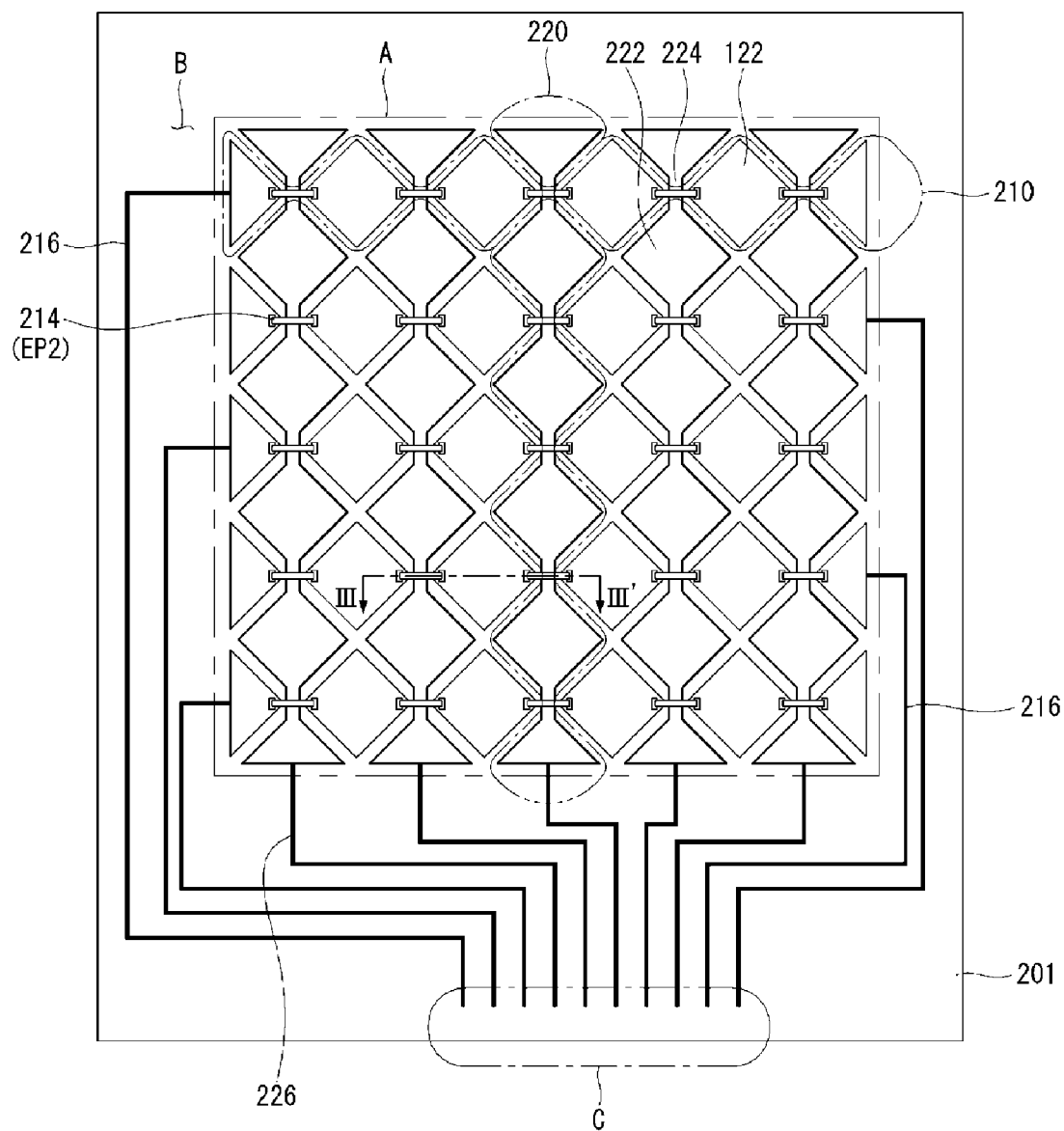
FIG. 7 is a plan view of a touchscreen panel according to a second exemplary embodiment of the present invention.
Figure 8:
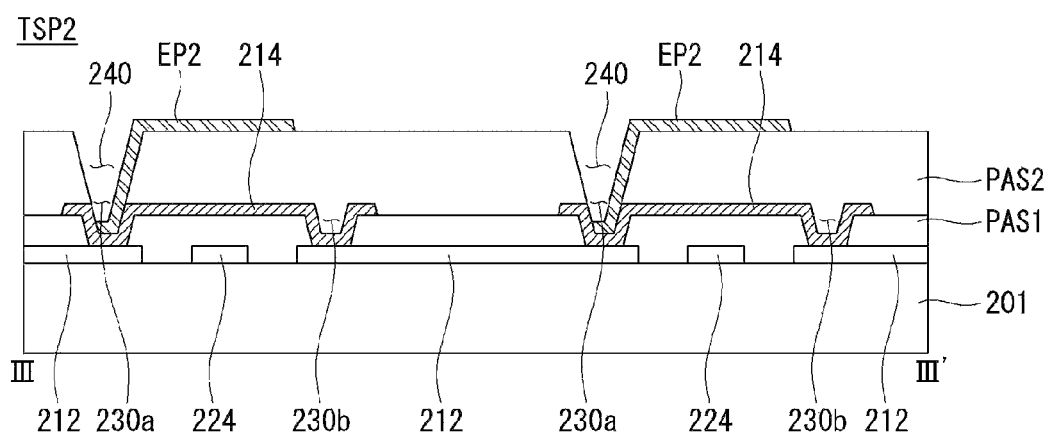
FIG. 8 is a cross-sectional view taken along line III-III' of the touchscreen panel of FIG. 7 according to the second exemplary embodiment of the present invention.

A touchscreen panel TSP2 according to a second exemplary embodiment of the present invention will be described with reference to FIGS. 7 and 8. FIG. 7 is a plan view of a touchscreen panel according to a second exemplary embodiment of the present invention. FIG. 8 is a cross-sectional view taken along line III-III' of the touchscreen panel of FIG. 7 according to the second exemplary embodiment of the present invention.

Referring to FIG. 7, the touchscreen panel TSP2 according to the second exemplary embodiment of the present invention comprises an electrode portion A, a routing wiring portion B, and a pad portion C.

The electrode portion A comprises a plurality of first electrode lines 210 arranged in parallel to a first direction (e.g., along the X-axis), a plurality of second electrode lines 220 arranged in a second direction (e.g., along the Y-axis) to cross the first electrode lines 210, and conductor rod patterns EP2 electrically connected to the first electrode lines 210. Each first electrode line 210 comprises first electrode patterns 212 that are triangular, rectangular, or diamond in shape and first connecting patterns 214 connecting the first electrode patterns 212. Each second electrode line 220 comprises second electrode patterns 212 that are triangular, rectangular, or diamond in shape, similar to the first electrode patterns 212, and second connecting patterns 224 connecting the second electrode patterns 222.

In the exemplary embodiment of the present invention, the first connecting patterns 214 are formed separately from the first electrode patterns 212, and the second connecting patterns 224 are formed integrally with the second electrode patterns 222. Conversely, the first connecting patterns 214 may be formed integrally with the first electrode patterns 212, and the second connecting patterns 224 may be formed separately from the second electrode patterns 222. For ease of explanation, a description of the first electrode patterns 214 formed separately from the first electrode patterns 212 will be given below by way of example.

The conductor rod patterns EP2 are electrically connected to the first electrode lines 210. The conductor rod patterns EP2 overlap the first connecting patterns 214. In the second exemplary embodiment of the present invention, overcurrent, which may flow into the first connecting patterns 214 due to static electricity generated during manufacturing, physical distribution, etc., is directed toward the conductor rod patterns EP2.

The routing wiring portion B is formed outside the electrode portion A, and consists of a plurality of first routing wires 216 respectively connected to the plurality of first electrode lines 210 and a plurality of second routing wires 226 respectively connected to the plurality of second electrode lines 220.

The pad portion C consists of a plurality of first pads (not shown) respectively connected to the plurality of first electrode lines 210 through the plurality of first routing wires 216 and a plurality of second pads (not shown) respectively connected to the plurality of second electrode lines 220 through the plurality of second routing wires 226.

Referring further to FIG. 8, the plurality of first electrode patterns 212 arranged in the first direction, the plurality of second electrode patterns 222 arranged in the second direction, and the second connecting patterns 224 connecting the second electrode patterns 222 may be formed on the substrate 200. The first electrode patterns 212, the second electrode patterns 222, and the second connecting patterns 224 may be formed by the same process, using the same material. For example, the first electrode patterns 212, the second electrode patterns 222, and the second connecting patterns 224 may be made from a transparent conductive material such as ITO (Indium Tin Oxide), IZO (Indium Zinc Oxide), or GZO (Gallium-Doped Zinc Oxide). The transparent conductive material such as ITO is advantageous in that its electrical conductivity increase as its thickness increases, but with a decrease in light transmission. Thus, it is necessary to properly adjust the thickness of the transparent conductive material by taking electrical conductivity and light transmission into account.

A first insulating film PAS1 is formed on the substrate 200 where the first connecting electrode patterns 212, the second electrode patterns 222, and the second connecting patterns 224 are formed. The first insulating film PAS1 may comprise, but is not limited to, silicon nitride (SiNx) and silicon oxide ($SiO_2$). First and second lower contact holes 230a and 230b exposing both ends of the first electrode patterns 212 are formed on the first insulating film PAS1.

The first connecting patterns 214 are formed on the first insulating film PAS1 where the first lower contact holes 230a and the second lower contact holes 230b are formed. The first electrode patterns 222 on the substrate 200 are separate from each other, but are electrically connected as the first connecting patterns 214 formed over the first insulating film PAS1 are connected to part of the first electrode patterns 212 via the first lower contact holes 230a and second lower contact holes 230b.

Also, resistance and visibility may be taken into consideration when determining the thickness and width of the first connecting patterns 214. In other words, the problem is that the thinner or narrower the first connecting patterns 214, the higher the resistance, and that the wider the first connecting patterns 214, the higher their visibility.

A second insulating film PAS2 is formed on the substrate 200 where the first connecting patterns 214 are formed. Upper contact holes 240 partially exposing the first connecting patterns 214 are formed on the second insulating film PAS2. The upper contact holes 240 overlap the first connecting patterns 214. In an example, the upper contact holes 240 may overlap either the first lower contact holes 230a or the second lower contact holes 230b, but the present invention is not limited to this example.

Conductor rod pattern EP2 to be connected to part of the first connecting patterns 214 via the upper contact holes 240 are formed on the second insulating film PAS2 where the upper contact holes 240 are formed. The conductor rod patterns EP2 overlap the first connecting patterns 214. The conductor rod patterns EP2 are made from a conductive material. In the present invention, overcurrent, which may be concentrated in the first connecting patterns 214, may be distributed to the conductor rod patterns EP2. Accordingly, the second exemplary embodiment of the present invention allows for safe protection of the touchscreen panel TSP2 from static electricity.

Visibility may be taken into consideration when determining the area of the conductor rod patterns EP2. That is, the area of the conductor rod patterns EP2 should be equal to or smaller than the area of the first connecting patterns 214 so that the conductor rod patterns EP2 do not protrude out of the first connecting patterns 214. Accordingly, the present invention ensures that the conductor rod patterns EP2 are not visible to the user from the front, thereby eliminating the problem of low visibility caused by the conductor rod patterns EP2.

In the second exemplary embodiment of the present invention, the resistance of the conductor rod patterns EP2 can be adjusted so that electrical charge is directed toward the conductor rod patterns EP2. The conductor rod pattern EP2 may be made from a different material than the first connecting patterns 214. That is, the material of the conductor rod patterns EP2 may have lower resistance than the material of the first connecting patterns 214. In this instance, electrical charge, which may be concentrated in the first connecting patterns 214, may be directed toward the conductor rod patterns EP2 since electrical charge tends to go where resistance is relatively low. In the second exemplary embodiment of the present invention, the conductor rod patterns EP2 are made from a material that is different from the first connecting patterns 214 and has lower resistance, so that overcurrent, which may flow into the first connecting patterns 214 due to static electricity, is distributed to the conductor rod patterns EP2. Accordingly, the touchscreen panel TSP of the second exemplary embodiment can reduce ESD problems.

In the present invention, overcurrent flowing into the first connecting patterns due to static electricity may be directed toward the conductor rod patterns. In the present invention, the conductor rod patterns overlap the first connecting patterns. Thus, the problem of low visibility caused by the conductor rod patterns can be eliminated. In the present invention, the conductor rod patterns are made from a material that is different from the first connecting patterns and has lower resistance, so that the overcurrent flowing into the first connecting patterns due to static electricity is directed more effectively toward the conductor rod patterns. In one embodiment of the present invention, the thickness and/or material of a passivation layer interposed between the conductor rod patterns and the second electrode lines may vary. Accordingly, the capacitance formed between the conductor rod patterns and the second electrode lines may be adjusted to be lower than the capacitance formed between the second electrode lines and the first connecting patterns, so that overcurrent, which may flow into the first connecting patterns, is directed more effectively toward the conductor rod patterns.

It will be apparent to those skilled in the art that various modifications and variations can be made in the touchsreen panel of the present invention without departing from the spirit or scope of the invention. Thus, it is intended that the present invention cover the modifications and variations of this invention provided they come within the scope of the appended claims and their equivalents.

What is claimed is:

1. A touchscreen panel comprising first and second electrode lines that cross each other, one of the first and second electrode lines being separated from the intersection of the first and second electrode lines, and the separated electrode line being connected to a bridge pattern via lower contact holes penetrating a first insulating film, the touchscreen panel comprising:
    a second insulating film covering the first insulating film; and
    a conductor rod pattern that is electrically connected to the separated electrode line via an upper contact hole penetrating the second insulating film and that overlaps the bridge pattern.

2. The touchscreen panel of claim 1, wherein the bridge pattern is disposed under the first insulating film, the first and second electrode lines are disposed between the first and second insulating films, and the separated electrode line is connected to the conductor rod pattern.

3. The touchscreen panel of claim 2, wherein the second insulating film is thicker than the first insulating film.

4. The touchscreen panel of claim 2, wherein the second insulating film has a lower dielectric constant than the first insulating film.

5. The touchscreen panel of claim 1, wherein the first and second electrode lines are disposed under the first insulating film, and the bridge pattern is disposed between the first and second insulating films and is connected to the conductor rod pattern.

6. The touchscreen panel of claim 1, wherein the conductor rod pattern has lower resistance than the bridge pattern.

7. The touchscreen panel of claim 1, wherein the conductor rod pattern within the bridge pattern has an area equal to or smaller than that of the bridge pattern.

8. The touchscreen panel of claim 1, wherein the upper contact hole overlaps one of the lower contact holes.

* * * * *